H. J. JONES.
GEAR SHIFT FOR AUTOMOBILES.
APPLICATION FILED APR. 26, 1918.
1,331,814.
Patented Feb. 24, 1920.
2 SHEETS—SHEET 1.
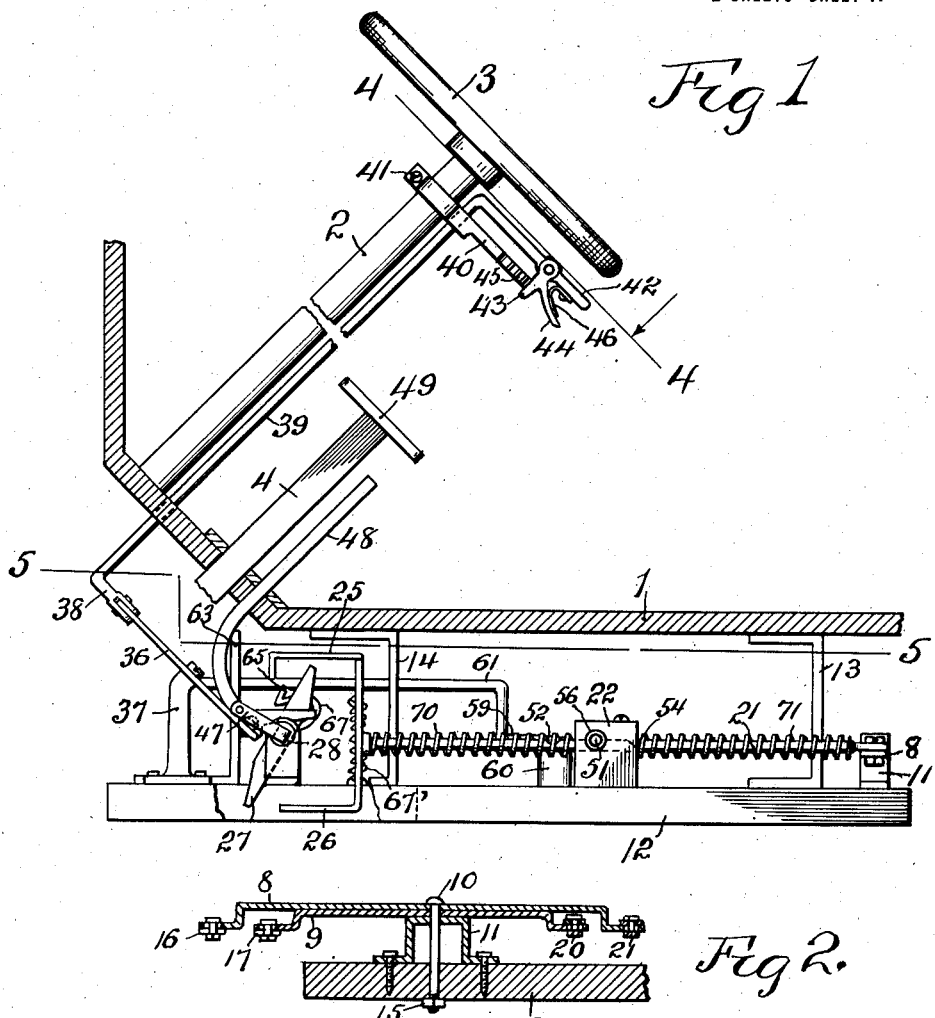
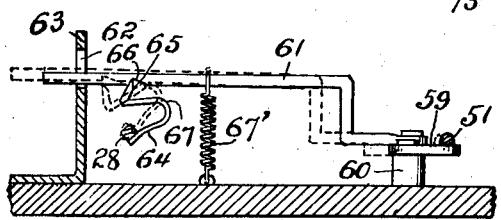
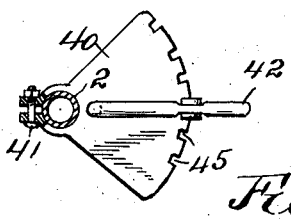
WITNESS:
R. E. Hamilton
INVENTOR.
Harry J. Jones
BY Warren D. House
His ATTORNEY H. J. JONES.
GEAR SHIFT FOR AUTOMOBILES.
APPLICATION FILED APR. 26, 1918.
1,331,814.
Patented Feb. 24, 1920.
2 SHEETS—SHEET 2.
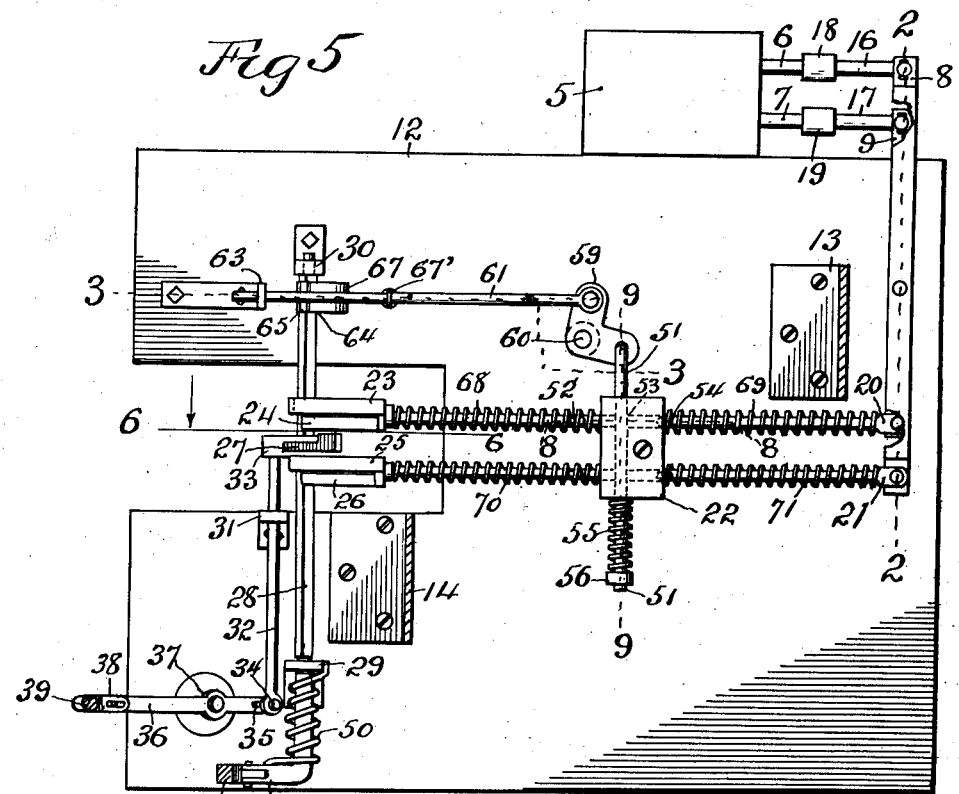
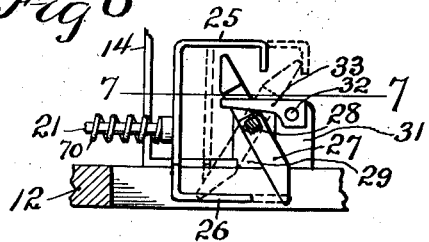
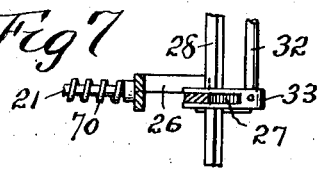
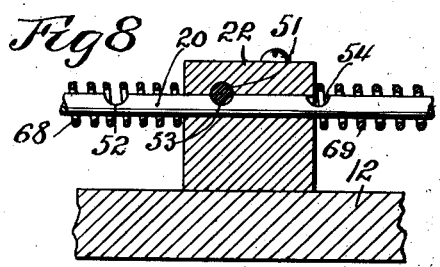
WITNESS
R. E. Hamilton
INVENTOR.
Harry J. Jones,
BY
Warren D. House
His ATTORNEY ated Feb. 24, 1920.
UNITED STATES PATENT OFFICE.

HARRY J. JONES, OF KANSAS CITY, MISSOURI.

GEAR-SHIFT FOR AUTOMOBILES.

1,331,814. Specification of Letters Patent. Patented Feb. 24, 1920.

Application filed April 26, 1918. Serial No. 230,967.

*To all whom it may concern:*

Be it known that I, HARRY J. JONES, a citizen of the United States, residing at Kansas City, in the county of Jackson and State of Missouri, have invented a certain new and useful Improvement in Gear-Shifts for Automobiles, of which the following is a specification.

My invention relates to improvements in gear shifts for automobiles.

One of the objects of my invention is to provide a gear shifting mechanism which will eliminate the liability of stripping the teeth from gears.

A further object of my invention is to provide a gear shifting mechanism which is easy to operate, which is simple in construction, which is not liable to get out of order, which may be economically manufactured, which is durable and which is efficient in operation.

Still another object of my invention is the provision of novel gear shifting mechanism which may be operated with the foot and at the same movement of the foot as is employed to release the clutch.

My invention is adapted for use in connection with the clutch operating member and gear shifting mechanism of machines now on the market.

The novel features of my invention are hereinafter fully described and claimed.

In the accompanying drawings, which illustrate the preferred embodiment of my invention, Figure 1 is a view partly in vertical section, and partly broken away, of my invention as applied to an ordinary automobile, a portion of which is shown.

Fig. 2 is a vertical sectional view on the line 2—2 of Fig. 5.

Fig. 3 is a vertical sectional view on the line 3—3 of Fig. 5.

Fig. 4 is a cross section on line 4—4 of Fig. 1.

Fig. 5 is a horizontal sectional view on the line 5—5 of Fig. 1.

Fig. 6 is a vertical sectional view on line 6—6, taken in the direction indicated by the arrow.

Fig. 7 is a horizontal sectional view on the line 7—7 of Fig. 6.

Fig. 8 is an enlarged vertical sectional view on the line 8—8 of Fig. 5.

Fig. 9 is a vertical sectional view on the line 9—9 of Fig. 5.

Similar reference characters designate similar parts in the different views.

1 designates the floor of an ordinary automobile body, 2 the steering post, 3 the steering wheel and 4 the usual clutch releasing operating member comprising an upwardly and downwardly slidable pedal, such as is commonly employed for releasing the clutch from the driving shaft or fly wheel.

5 designates the usual gear casing, and 6 and 7 designate respectively the usual two sliding shafts which form part of the gear shifting mechanism.

The parts which have just been described are such as are common to many kinds of automobiles which are now on the market. With this type of automobile, the clutch is released by pressing the pedal 4 with the foot, the pedal being capable of being moved downwardly a considerable distance after the clutch has been released. My invention takes advantage of this feature of pedal construction, the pedal being employed, in my invention, in that portion of its movement after the clutch has been released for shifting the gears to the desired position. For effecting this, the following described mechanism is employed.

In Figs. 1 and 5, the gear shifting shafts 6 and 7 and the parts connected therewith are shown in the neutral position, in which position the gears are disconnected and the vehicle propelling mechanism is inert.

If now the shaft 7 be forced outwardly a pre-determined distance, the gears will be shifted "on high". If shifted inwardly from the neutral position, the shaft 7 will throw the gears into "intermediate". In like manner, when the shaft 6 is forced outwardly, that is, to the right, as viewed in Fig. 5, from the neutral position, the gears will be moved to "low". When the shaft 6 is moved from the neutral position inwardly the proper distance, the gears will be thrown into "reverse".

For shifting the shafts 6 and 7 to these different positions, I provide gear shifting mechanism comprising the following described parts.

8 and 9 designate respectively two transverse horizontal levers mounted one above the other, as shown in Fig. 2, and centrally pivoted by means of a vertical bolt 10 upon an inverted U-shaped bracket 11 which is secured to the uper side of a horizontal platform 12, which is supported by hangers 13 and 14 below the floor 1 to which the hangers are secured. The bolt 10 extends through the platform 12, to which it is secured by a nut 15.

One set of ends of the levers 8 and 9 are pivoted respectively to two rods 16 and 17 which are respectively connected by couplings 18 and 19, with the shafts 6 and 7, see Fig. 5.

The other set of ends of the levers 9 and 8 are respectively pivoted to two parallel longitudinal reciprocative members comprising two bars 20 and 21, to the rear ends of which the adjacent ends of the levers 9 and 8 are respectively pivoted.

The bars 20 and 21 are slidably mounted in holes provided therefor in a block 22 which is supported upon the platform 12.

To the forward end of the bar 20, is secured a U-shaped member, the arms 23 and 24 of which are disposed one higher than the other and at opposite sides of a vertical longitudinal plane. A similar U-shaped member having similarly shaped and disposed horizontal arms 25 and 26 is secured to the forward end of the bar 21. The forward ends of the arms 23 and 25 are turned downwardly, as shown in Figs. 1 and 6.

The arms 23 and 25 are employed to respectively draw the bars 20 and 21 forwardly so as to shift the shafts 7 and 6 rearwardly to the high and low speeds respectively, through the intermediacy of the levers 9 and 8 and connecting rods 17 and 16.

The arms 24 and 26 are employed to force the bars 20 and 21 rearwardly, thereby forcing the shafts 7 and 6 forwardly to the intermediate and reverse positions respectively.

For engaging with the arms 23, 24, 25 and 26, for longitudinally moving the bars 20 and 21, I provide a bar 27, which is slidable longitudinally on a horizontal transverse rock shaft 28 fitted in a square hole in the bar 27 and oscillatably mounted in bearings 29 and 30, which are supported on the upper side of the platform 12.

The bar 27 is adapted to be slid longitudinally from the central neutral position shown in Fig. 5, into positions for respectively engaging the arms 23, 24, 25 and 26, as may be desired. For so sliding the bar 27, I provide an annularly operable means comprising the following described parts.

Longitudinally slidable in a bearing 31, Fig. 5, is a transverse horizontal rod 32, to one end of which is secured a bifurcated plate 33, the arms of which respectively embrace opposite sides of the bar 27. The other end of the rod 32 has secured to it a pin 34, which is slidably mounted in a slot 35, which is provided in the lower end of a forwardly and upwardly inclined lever 36, which is pivoted to the upper end of a standard 37, Fig. 1, which is supported upon the platform 12. The other or upper end of the lever 36 is pivoted to a crank 38 which is provided at the lower end of a lever 39 which extends obliquely upwardly and rearwardly through the floor 1 and to the rear and parallel with the steering post 2. The lever 39 is pivotally mounted in and extends through the sector plate 40 which embraces the post 2, to which it is clamped by means of a bolt 41. The lever 39 above the plate 40 is provided with a crank arm 42, to which is pivoted a bell crank lever, one arm 43 of which is adapted to enter notches 45 provided in the lower arcuate edge of the plate 40. The other arm 44 of the bell crank lever is engaged by a spring 46 secured to the crank arm 42 and which normally forces the lever in a position to enter the notches 45.

By properly swinging the crank arm 42, the bar 27 may be moved on the rock shaft 28 from the neutral position to positions for engaging any one of the arms 23, 24, 25, or 26.

For rocking the rock shaft 28, it is provided at one end with a crank 47, Figs. 1 and 5, which is pivoted to the lower end of a bar 48 which extends upwardly through and is slidable in the floor 1. The upper end of the bar 48 is disposed so as to be struck by the foot piece 49 with which the upper end of the pedal 4 is provided, after the pedal has moved downwardly to a position in which the clutch will be released.

A coil spring 50, which encircles the rock shaft 28 and has its ends respectively engaging the bearing 29 and the crank 47, is employed to retract the rock shaft to the position shown in Fig. 1, after it has been rocked downwardly by the bar 48 being engaged with the foot piece 49.

For releasably locking the bars 20 and 21 in the neutral and active positions, there is slidably mounted in the block 22 a horizontal transverse rod 51 which is adapted to enter any one of three notches 52, 53 and 54 provided in each bar 20 and 21.

A coil spring 55 encircling the rod 51 bears at one end against the block 22 and at the other end against a collar 56 fixed on the rod 51. The spring 55 normally forces the rod 51 to the locking position. The under side of the rod 51 is provided with two notches 57 and 58 adapted to respectively receive the rods 20 and 21 when the rod 51 is pulled to the release position against the pressure of the spring 55. This is effected by means of a bell crank lever 59 pivoted on a bearing 60 mounted on the platform 12. The bell crank lever 59 is pivoted to the rear end of a longitudinal rod 61, Figs. 3 and 5, which is slidable in a slot 62 in a bearing plate 63 mounted on the platform 12.

Secured to the rock shaft 28 is a cam plate 64 having a tooth 65 adapted to enter a notch 66 in the under side of the rod 61. When the rock shaft is rocked by the pedal 4, the tooth 65 engages the rod 61 and draws the rod forwardly, thus drawing the rod 51 to the release position by means of the bell crank lever 59. If now the bar 27 be engaged with the arm 23, the bar 20 will be pulled forwardly, thus swinging the lever 9 so as to pull rearwardly the shaft 7, thereby throwing the gears in the casing 5 into high speed. At this time the bars 20 and 21 will be in the notches 57 and 58, and the rod 51 will be held by the bar 20 in the release position. The cam plate 64 is provided with a cam portion 67 which engages with the under side of the rod 61 and swings upwardly said rod so that the tooth 65 is disengaged from the rod 61, upon which the spring 55 will tend to force the rod 51 to the locked position, shown in Figs. 5 and 9. As soon as the bar 20 has been moved forwardly to a position in which the notch 54 is in alinement with the rod 51, the latter will enter said notch, thereby locking the bar 20 in the "high" position, in which position it will stay until the pedal 4 is again moved downwardly so as to rock the rock shaft 28 and thereby draw the rod 51 to the released position, by means of the mechanism already described. A coil spring 67' holds the rod 61 engaged with plate 64.

For normally forcing the bars 20 and 21 to the neutral position shown in Fig. 5, four coil springs 68, 69, 70 and 71 are provided. The springs 68 and 69 encircle the bar 20 and bear at one set of ends against opposite sides of the block 22. The other set of ends bear respectively against the rear part of the bar 20 and the U-shaped member having the arms 23 and 24. The springs 70 and 71 are similarly disposed with reference to the bar 21.

The springs 68, 69, 70 and 71 normally tend to force the bars 20 and 21 to the neutral position in which the rod 51 will enter the notches 53.

In like manner the bar 27 may be shifted on the rock shaft 28 so as to engage with the downwardly turned end of the arm 25 when the rock shaft 28 is rocked by the pedal 4, thereby shifting the bar 21 to the forward or "low" position.

By shifting the bar 27, through the intermediacy of the mechanism already described, to a position in front of the arm 24, the lower end of the bar will engage the front end of the arm 24, when the pedal 4 is depressed, thereby forcing rearwardly to the "intermediate" position the bar 20, in which position the rod 51 will enter the notch 52 of the bar 20 and hold said bar locked. In like manner, when the bar 27 is moved in front of the arm 26 and the rock shaft 28 is rocked by depression of the pedal 4, the bar 21 will be forced rearwardly to the "reverse" position.

Thus after adjusting the bar 27 by means of the crank arm 42 to the desired position for engagement with any one of the arms 23, 24, 25 or 26, the operator with one foot movement can first release the clutch by depressing the pedal 4, and then shift the gears to the position for the desired speed or for reversing. The gears will be held in the positions to which they are adjusted until the operator again depresses the pedal 4. As the clutch must first be released in the initial movement of the pedal 4, there is no liability of the operator accidentally or ignorantly stripping the teeth from the gears.

I do not limit my invention to the structure shown and described, as modifications, within the scope of the appended claims, may be made without departing from the spirit of my invention.

What I claim is:—

1. In a gear shift for automobiles, a gear shifting member, a reciprocative member, means actuated by the reciprocative member engaging and adapted to move said gear shifting member, means constantly exerted for normally forcing said reciprocative member to a neutral position, a rock shaft, manually operated means for forcing the rock shaft in one direction, means for retracting the rock shaft in the opposite direction, a connecting member movable laterally to two positions and oscillatable with the rock shaft, the reciprocative member having means for being engaged by said connecting member in the two positions of the latter, such means of engagement effecting a movement from the neutral position of the reciprocative member in one direction when the rock shaft is rocked in one direction and effecting a movement from the neutral position of the reciprocative member in the opposite direction, when the rock shaft is rocked in the said one direction, and the connecting member is respectively in said two positions, and manually operated means by which the connecting member is moved to either of said two positions.

2. In a gear shift for automobiles, a gear shifting member, a reciprocative member, means actuated by the reciprocative member engaging and adapted to move said gear shifting member to and fro, means constantly exerted for normally forcing the reciprocative member to a neutral position, a rock shaft, manually operated means for rocking the rock shaft in one direction, means for retracting the rock shaft, a connecting member movable laterally to two positions and oscillatable with the rock shaft, the reciprocative member having means for operatively engaging the connecting member in said two positions, such means of engagement effecting movement from the neutral position in one direction of the reciprocative member, when the rock shaft is rocked in one direction, and the connecting member is in one of said positions, and effecting a movement from the neutral position in the opposite direction of the reciprocative member, when the rock shaft is rocked in the said one direction, and the connecting member is in the other of said two positions, manually operated means by which the connecting member is moved to either of said two positions, and means for releasably locking the reciprocative member into positions to which it may be adjusted.

3. In a gear shift for automobiles, a gear shifting member, a reciprocative member, means actuated by the reciprocative member engaging and adapted to move said gear shifting member to and fro, means constantly exerted for normally forcing said reciprocative member to a neutral position, a rock shaft, a clutch operating member, means actuated by the clutch operating member for rocking the rock shaft in one direction, means for retracting the rock shaft in the opposite direction, a connecting member movable laterally to two positions and oscillatable with the rock shaft the reciprocative member having means for engagement with said connecting member in the two lateral positions of the latter, such means of engagement effecting movement from the neutral position in one direction of the reciprocative member, when the rock shaft is rocked in one direction and the connecting member is in one of said positions, and effecting a movement in the opposite direction from the neutral position of the reciprocative member, when the rock shaft is rocked in the said one direction and the connecting member is in the other of said two positions, and manually operated means for moving said connecting member laterally to either of said two positions.

4. In a gear shift for automobiles, a reciprocative member, a gear shifting member, means actuated by the reciprocative member for moving said gear shifting member, a rock shaft, a connecting member oscillatable with the rock shaft and movable thereon to two positions, and arranged when in said positions and the rock shaft is rocked in one direction to move said reciprocative member in opposite directions from a neutral position, a locking member having means for locking said reciprocative member in the neutral position and in two positions, at opposite sides respectively of the neutral position, yielding means for normally forcing the locking member to the locking position, and means actuated by the rock shaft by which when the rock shaft is rocked in one direction, the rocking member will first be released from the reciprocative member and upon further movement of the rock shaft in the same direction, the locking member will be released and permitted to be retracted to the locking position.

5. In a gear shift for automobiles, a gear shifting member, a reciprocative member movable from a neutral to two positions, means actuated by the reciprocative member for moving the gear shifting member, a rock shaft, means manually adjustable by which the rock shaft when rocked in one direction may move said reciprocative member to either of said two positions, a locking member adapted to engage and lock the reciprocative member in said three positions, means actuated by the rock shaft when rocked in one direction for first moving the locking member to the unlocked position and on the continued movement of the rock shaft releasing said locking member, and means for normally retracting the locking member to the locking position.

6. In a gear shift for automobiles, a gear shifting member, a reciprocative member movable from a neutral to two positions, means actuated by the reciprocative member for moving the gear shifting member, means for normally locking said reciprocative member in either of said three positions, a rock shaft, means actuated by the rock shaft for moving the reciprocative member from the neutral to either of said two positions, and means actuated by the rock shaft by which when the rock shaft is rocked in one direction, the locking means will first be actuated to release the reciprocative member and on continued movement of the rock shaft, the locking means will be permitted to move to the locking position.

In testimony whereof I have signed my name to this specification.

HARRY J. JONES.